United States Patent
Junkawitsch et al.

(10) Patent No.: US 6,505,156 B1
(45) Date of Patent: Jan. 7, 2003

(54) METHOD FOR RECOGNIZING A KEYWORD IN SPEECH

(75) Inventors: Jochen Junkawitsch, München (DE); Harald Höge, Gauting (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/486,428

(22) PCT Filed: Sep. 7, 1998

(86) PCT No.: PCT/DE98/02633
§ 371 (c)(1),
(2), (4) Date: Feb. 25, 2000

(87) PCT Pub. No.: WO99/14741
PCT Pub. Date: Mar. 25, 1999

(30) Foreign Application Priority Data

Sep. 18, 1997 (DE) .......................................... 197 41 211

(51) Int. Cl.⁷ ............................................... G10L 15/14
(52) U.S. Cl. .................... 704/256; 704/240; 704/242
(58) Field of Search ................. 704/255, 256, 704/257, 242, 236, 240, 200

(56) References Cited

U.S. PATENT DOCUMENTS

| | | | |
|---|---|---|---|
| 5,440,662 A | * | 8/1995 | Sukkar ........................ 704/236 |
| 5,797,123 A | * | 8/1998 | Chou et al. .................. 704/256 |
| 5,832,430 A | * | 11/1998 | Lleida et al. ................ 704/256 |
| 5,842,163 A | * | 11/1998 | Weintraub .................... 704/240 |
| 6,125,345 A | * | 9/2000 | Modi et al. .................. 704/240 |
| 2001/0018654 A1 | * | 8/2001 | Hon et al. .................... 704/257 |

OTHER PUBLICATIONS

1997 IEEE International Conference on Acoustics, Speech, and Signal Processing, 1997. ICASSP–97. Holzapfel et al., "Failure simulation for a phoneme HMM based keyword spotter".PP 911–914 vol. 2. Apr. 1997.*
1993 IEEE International Conference on Acoustics, Speech, and Signal Processing, 1997. ICASSP–93. Chen et al., "Word spotting in scanned images using hidden Markov models". PP 1–4 vol. 5. Apr. 1993.*
Proceedings., Fourth International Conference on Spoken Language, 1996. ICSLP 96. Junkawitsch et al. "A new keyword spotting algorithm with pre–calculated optimal thresholds". PP 2067–2070 vol. 4. Oct. 1996.*
Sprache erkennen—Feb. 1991—Grudlagen des Phonetic Typewriters–pp. 70–75.
Kapitel 2 Modellierung—19/07/93 pp. 13–35.
An Introduction to Hidden Markov Models—Rabiner et al—IEEE ASSP Magazine Jan. 1986.
Optimizing Recognition and Rejection Performance In Wordspotting Systems–Bourlard et al L & H Speech Products 1994 IEEE.

(List continued on next page.)

Primary Examiner—Richemond Dorvil
(74) Attorney, Agent, or Firm—Bell Boyd & Lloyd LLC

(57) ABSTRACT

A keyword is recognized in spoken language by assuming a start of this keyword is at every sampling time. An attempt is then made to image this keyword onto a sequence of HMM statusses that represent the keyword. The best path in a presentation space is determined with the Viterbi algorithm; and a local confidence standard is employed instead of the emission probability used in the Viterbi algorithm. When a global confidence standard that is composed of local confidence standards downwardly crosses a lower barrier for the best Viterbi path, then the keyword is recognized; and the sampling time assumed as start of the keyword is confirmed.

11 Claims, 2 Drawing Sheets

OTHER PUBLICATIONS

Keyword–Spotting Using SRI's Decipher™ Large–Vocabulary Speech–Recognition System—Weintraub SRI International 1993—II–463–II466.

Likelihood Ratio Decoding and Cofidence Measures For Continous Speech Recognition–Lleida, Rose—AT&T Research Murray Hill, USA—pp. 478–481.

A Phone–Dependent Confidence Measure For Utterance Rejection, Rivlin et al, 1996 IEEE pp. 515–517.

Confidence Measures For The Switchboard Database—Cox et al—1996 IEEE pp. 511–514.

* cited by examiner

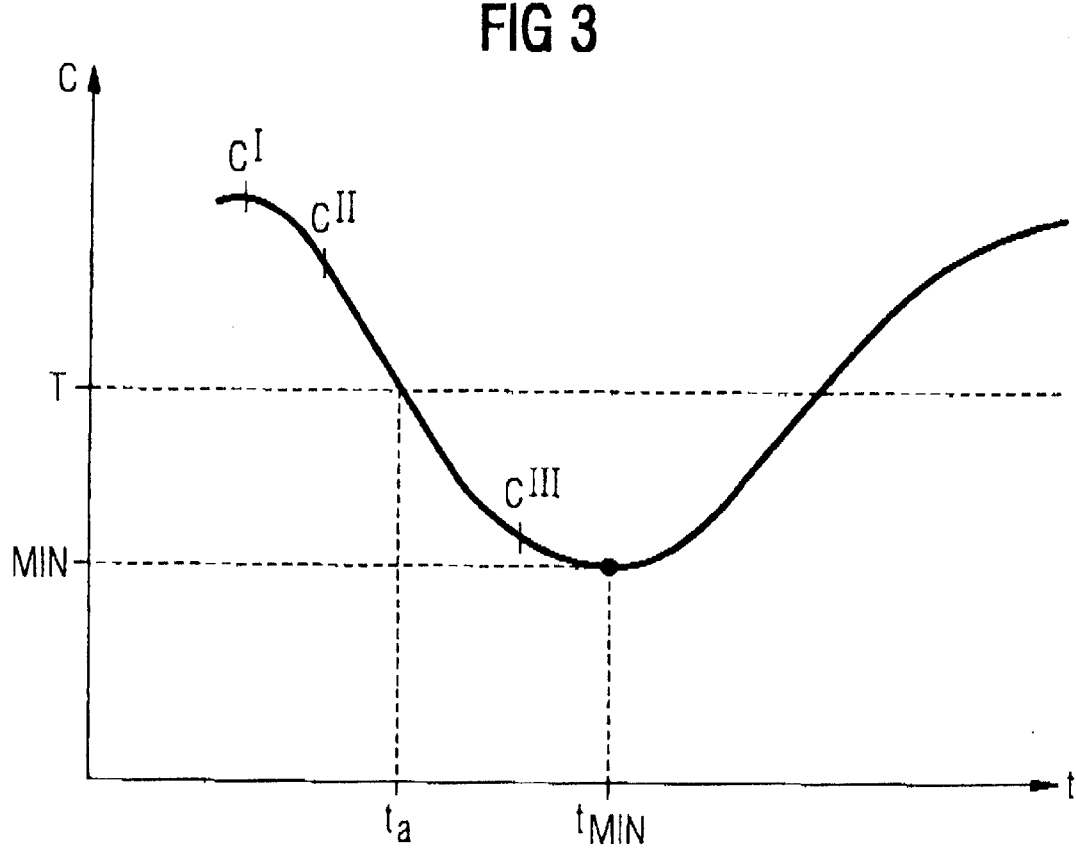

METHOD FOR RECOGNIZING A KEYWORD IN SPEECH

BACKGROUND OF THE INVENTION

The invention is directed to a method for recognizing a keyword in spoken language.

A modelling of the complete spoken expression has hitherto always been required in the recognition of a keyword in spoken language. The person skilled in the art is familiar with essentially two methods:

M. Weintraub, "Keyword-spotting using SRI's DECIPHER large-vocabulary speech-recognition system", Proc. IEEE ICASSP. Vol. 2, 1993, pp. 463–466 discloses a method for the recognition of a keyword that employs a speech recognition unit with a large vocabulary. The attempt is thereby made to completely recognize the spoken language. Subsequently, the recognized words are investigated for potentially existing keywords. This method is complex and affected with errors because of the large vocabulary and because of the problems in the modelling of spontaneous vocal expressions and noises, i.e. part of the voice signal that cannot be unambiguously allocated to a word.

Another method employs specific filler models (also: garbage models) in order to model parts of expressions that do not belong to the vocabulary of the keywords (what are referred to as OOV parts; OOV=out of vocabulary). Such a speech recognition unit is described in H. Boulard, B. D'hoore and J.-M. Boite, "Optimizing recognition and rejection performance in wordspotting systems", Proc. IEEE ICASSP, vol. 1, 1994, pages 373–376, and comprises the keywords as well as a filler model or a plurality of filler models. One difficulty is to design or train a suitable filler model that contrasts well with the modelled keywords, i.e. exhibits high discrimination with respect to the keyword models.

Further, hidden Markov models (HMMs) are known from L. R. Rabiner, B. H. Juang, "An Introduction to Hidden Markov Models", IEEE ASSP Magazine, 1986, pp. 4–16, or A. Hauenstein, "Optimierung von Algirthmen und Entwurf eines Prozessors für die automatische Spracherkennung", Doctoral Dissertation at the Chair for Integrated Circuits of the Technical University, Munich, Jul. 19, 1993, pp. 13–35. It is also known from Rabiner et al or Hauenstein to define a best path with the Viterbi algorithm.

Hidden Markov models (HMMs) serve the purpose of describing discrete stochastic processes (also called Markov processes). In the field of speech recognition, hidden Markov models serve, among other things, for building up a word lexicon in which the word models constructed of sub-units are listed. Formally, a hidden Markov model is described by:

$$\lambda = (A, B, \underline{\pi}) \qquad (0\text{-}1)$$

with a quadratic status transition matrix A that contains status transition probabilities $A_{ij}$:

$$A = \{A_{ij}\} \text{ with } i,j=1, \ldots, N \qquad (0\text{-}2)$$

and an emission matrix B that comprises emission probabilities $B_{ik}$:

$$B = \{B_{ik}\} \text{ with } i=1, \ldots, N; \ k=1, \ldots, M \qquad (0\text{-}3)$$

An n-dimensional vector $\underline{\pi}$ serves for initialization, an occurrence probability of the N statusses for the point in time t=1 defined:

$$\pi = \{\pi_i\} = P(s(1) = s_i) \qquad (0\text{-}4)$$

In general, $$P(s(t) = q_t) \qquad (0\text{-}5)$$

thereby indicates the probability that the Markov chain $$s = \{s(1), s(2), s(3), \ldots, s(t), \ldots\} \qquad (0\text{-}6)$$

is in status $q_t$ at time t. The Markov chain s thereby comprises a value range $$s(t) \in \{s_1, s_2, \ldots, s_N\} \qquad (0\text{-}7)$$

whereby this value range contains a finite set of N statusses. The status in which the Markov process is at time t is called $q_t$.

The emission probability $B_{ik}$ derives from the occurrence of a specific symbol $\sigma_k$ in the status $s_i$ as $$B_{ik} = P(\sigma_k | q_t = s_i) \qquad (0\text{-}8)$$

whereby a character stock $\Sigma$ having the size M comprises symbols $\sigma_k$ (with k=1 ... M) according to $$\Sigma = \{\sigma_1, \sigma_2, \ldots, \sigma_M\} \qquad (0\text{-}9)$$

A status space of hidden Markov models derives in that every status of the hidden Markov model can have a predetermined set of successor statusses: itself, the next status, the next but one status, etc. The status space with all possible transitions is referred to as trellis. Given hidden Markov models of the order 1, a past lying more than one time step in the past is irrelevant.

The Viterbi algorithm is based on the idea that, when one is locally on an optimum path in the status space (trellis), this is always a component part of a global optimum path. Due to the order 1 of the hidden Markov models, only the best predecessor of a status is to be considered, since the poorer predecessors have received a poorer evaluation in advance. This means that the optimum path can be sought recursively time step by time step beginning from the first point in time, in that all possible continuations of the path are identified for each time step and only the best continuation is selected.

A respective modelling of the OOV parts is required given the methods described in Weintraub and Boulard et al. In the former instance of Weintraub, the words of the expression must be explicitly present in the vocabulary of the recognition unit; in the latter instance of Boulard et al, all OOV words and OOV noises are presented by specific filler models.

SUMMARY OF THE INVENTION

The object of the invention is comprised in specifying a method that enables the recognition of a keyword in spoken language, whereby the above-described disadvantages are avoided.

According to the method of the invention for recognizing a keyword in spoken language, the keyword is represented by a sequence of statusses W of hidden Markov models. The spoken language are sampled with a predetermined rate and a feature vector $O_t$ is produced at every sampling time t for a voice signal from the spoken language belonging to the sampling time t. The sequence O of feature vectors $O_t$ are imaged onto the sequence of the statusses with a Viterbi algorithm, whereby a local confidence standard is calculated on the basis of an emission standard at a status. With the Viterbi algorithm, a global confidence standard is supplied.

The keyword in the spoken language is recognized when the following applies:

A method for recognizing a keyword in spoken language, comprising the steps of representing the keyword by a sequence of statuses W of hidden Markov models; sampling the spoken language with a predetermined rate and providing a feature vector $O_t$ at every sampling time t for a voice signal from the spoken language belonging to the sampling time t; imaging a sequence O of feature vectors $O_t$ onto the sequence of statuses with a Viterbi algorithm, whereby a local confidence standard is calculated on the basis of an emission standard at a status; with the Viterbi algorithm supplying a global confidence standard; recognizing the keyword in the spoken language when the following applies $C(W, O) < T$,
where C( ) denotes the confidence standard, W denotes the keyword, presented as a sequence of statuses, O denotes the sequence of feature vectors $O_t$, T denotes a predetermined threshold.

Otherwise, the keyword in the spoken language is not recognized.

One advantage of the invention is comprised that a keyword is recognized within the spoken language without the expression having to be modelled overall. As a result thereof, a clearly reduced expense derives in the implementation and, accordingly, a higher-performance (faster) method. By employing the (global) confidence standard C as the underlying decoding principle, the acoustic modelling within the decoding procedure is limited to the keywords.

One development is that a new path through the status space of the hidden Markov models in a first status of the sequence of statusses W begins at each sampling time t. As a result thereof, it is assumed at every sampling time that a beginning of a keyword is contained in the spoken language. On the basis of the confidence standard, feature vectors resulting from following sampling times are imaged onto those statusses of the keyword represented by hidden Markov models. A global confidence standard derives at the end of the imaging, i.e. at the end of the path, with reference whereto a decision is made as to whether the presumed beginning of the keyword was in fact such a beginning. If yes, the keyword is recognized; otherwise, it is not recognized.

Within the scope of a development of the invention, the global confidence standard C is defined by $$C = -\log P(W|O) \quad (2)$$

and the corresponding local confidence standard c is defined by $$c = -\log \frac{P(O_t|s_j) \cdot P(s_j)}{P(O_t)}, \quad (3)$$

whereby $s_j$ denotes a status of the sequence of statusses,

P(W|O) denotes a probability for the keyword under the condition of a sequence of feature vectors $O_t$, $P(O_t|s_j)$ denotes the emission probability, $P(s_j)$ denotes the probability for the status $s_j$, $P(O_t)$ denotes the probability for the feature vector $O^t$.

A suitable global confidence standard is characterized by the property that it provides information about the degree of a dependability with which a keyword is detected. In the negative logarithmic range, a small value of the global confidence standard C expresses a high dependability.

Within the scope of an additional development, the confidence standard C is defined by $$C = -\log \frac{P(O|W)}{P(O|\overline{W})} \quad (4)$$

and the corresponding local confidence standard is defined by $$c = -\log \frac{P(O_t|s_j)}{P(O_t|\overline{s_j})} \quad (5)$$

whereby $P(O|\overline{W})$ denotes the probability for the sequence of feature vectors $O_t$ under the condition that the keyword W does not arrive, $\overline{s_j}$ denotes the counter-event for the status $s_j$ (i.e.: not the status $s_j$).

The advantage of the illustrated confidence standards is comprised, among other things, in that they can be calculated, i.e. no prior training and/or estimating is/are required.

The definition of the local confidence standards can be respectively derived from the definitions of the global confidence standards. Local confidence standards enter into the calculation of the confidence standard for a keyword at those points in time that coincide in time with the expression of this keyword.

The local confidence standards can be calculated with the relationships $$P(O_t) = \sum_k P(O_t|s_k) \cdot P(s_k) \quad \text{and} \quad (6)$$

$$P(O_t|\overline{s_j}) = \sum_{k \neq j} P(O_t|s_k) \cdot P(s_k) \quad (7)$$

Further, it is possible to determine $P(O_t)$ or, respectively, $P(O_t|\overline{s_j})$ with suitable approximation methods. An example of such an approximation method is the averaging of the n-best emissions $-\log P(O_t|s_j)$ at every time t.

The decoding procedure is usually implemented with the assistance of the Viterbi algorithm:

$$C_{t,s_j} = \min_k (C_{t-1,s_k} + c_{t,s_j} + a_{kj}),$$

where $C_{t,sj}$ denotes the global, accumulated confidence standard at time t in the status $s_j$, $C_{t-1,sk}$ denotes the global, accumulated confidence standard at the time t–1 in the status $s_k$, $c_{t,sj}$ denotes the local confidence standard at the time t in the states $s_j$, $a_{kj}$ denotes a transition penalty from the status $S_k$ into the status $S_j$.

Since no local confidence standards outside the time limits of the keyword are required for a presentation of the global confidence standard for a keyword, an acoustic modelling of the OOV parts can be foregone in the search for the keyword.

By applying the Viterbi algorithm with the possibility of starting a new path in the first status of a keyword at every time t, whereby the keyword is preferably subdivided into individual statusses of a hidden Markov model (HMM), the global confidence standard is optimized for every keyword and, at the same time, the optimum starting time is determined (backtracking of the Viterbi algorithm).

For a predetermined time span, it is also expedient to also seek a minimum below the threshold T. Multiple recognition of a keyword within this predetermined time span is thereby avoided.

When there are keywords that are similar to one another in view of their descriptive form represented by the respective sequence of statusses, then it is useful to utilize a mechanism that, given recognition of a keyword, precludes that another keyword was partially contained in the spoken voice signal in the time span of the recognized keyword.

Exemplary embodiments of the invention are presented with reference to the following Figures.

BRIEF DESCRIPTION OF THE DRAWINGS

FIG. 3 is a sketch like FIG. 3 that shows the curve of an assumed confidence standard over a predetermined time span.

DESCRIPTION OF THE PREFERRED EMBODIMENTS

Figure 1:
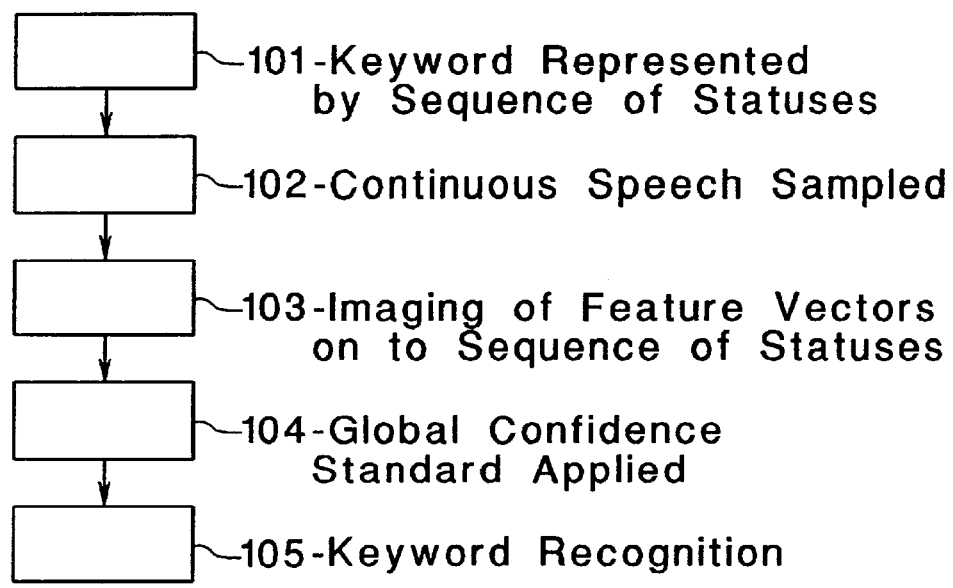
FIG. 1 is a block circuit diagram of a method for recognizing a keyword in spoken language.

FIG. 1 shows a block circuit diagram of a method for recognizing a keyword in continuous speech.

In a step 101, the keyword is represented by a sequence of statusses W. Phoneme HMMs, each having three statusses, are preferably utilized for this purpose (see Rabiner et al). In a next step 102, the continuous speech is sampled, and a feature vector $O_t$ for a voice signal belonging to the sampling time t is produced from the continuous speech at every sampling time t. As components, the feature vector $O_t$ thereby comprises a prescribed set of features that are characteristic of the voice signal at the sampling time t.

In a step 103, a sequence of feature vectors that have been acquired from the voice signal for various sampling times t are imaged onto the sequence of statusses W. The Viterbi algorithm thereby represents one imaging rule (see Rabiner et al). The emission probability $-\log P(O_t|s_j)$ utilized in the Viterbi algorithm is thereby replaced by a local confidence standard. In a step 104, the Viterbi algorithm supplies a global confidence standard C at every point in time, this comprising individual, local confidence standards in cumulative form for the detected statusses of the sequence of statusses W. In a step 105, the keyword is considered recognized in the continuous speech when the following applies:

$$C(W,O) < T \qquad (1),$$

whereby

| | |
|---|---|
| C( ) | denotes the global confidence standard, |
| W | denotes the keyword presented as a sequence of statusses, |
| O | denotes the sequence of feature ventures, $O_1$, |
| T | denotes a predetermined threshold. |

Otherwise, the keyword is not recognized in the continuous speech.

Two possible realizations for a global confidence standard and a respectively corresponding local confidence standard are described below. Other confidence standards are conceivable.

First Confidence Standard

The first global confidence standard is defined from the negative logarithm of an a posteriori probability for the keyword as a dependability criterion:

$$C_1 = -\log P(W|O) \qquad (2).$$

Bayes' rule is subsequently applied in conjunction with the following assumptions:

$$P(O) = \prod_t P(O_t), \qquad (8)$$

$$P(W) = \prod_t P(s_{\psi(t)}), \qquad (9)$$

$$P(O|W) = \prod_t [P(O_t|s_{\psi(t)}) \cdot a_{\psi(t-1),\psi(t)}]. \qquad (10)$$

The probability for a sequence of feature vectors P(O) is thereby expressed as a multiplication of probabilities for individual feature vectors $P(O_t)$. The probability for an entire word P(W) is calculated in the same way in that the individual probabilities $P(s_{\psi(t)})$ of each individual, selected status of an HMM are multiplied, whereby the function $\psi(t)$ is an imaging of the feature vectors (i.e. of the time) onto the statusses of the keyword. The conditional probability P(O|W) corresponds to the ordinary probability of the HMM that can be calculated with the emission probabilities $P(O_t|s_{\psi(t)})$ and the transition probabilities $a_{\psi(t-1),\psi(t)}$. The global confidence standard $C_1$ thus derives as:

$$C_1 = \sum_t -\log\left(\frac{P(O_t|s_{\psi(t)}) \cdot P(s_{\psi(t)})}{P(O_t)} \cdot a_{\psi(t-1),\psi(t)}\right). \qquad (11)$$

When the operation of the Viterbi algorithm is considered, then the definition of a local confidence standard $c_1(O_t|s_j)$ that is used within the search event of the Viterbi algorithm is recommendable:

$$c_1(O_t|s_j) = -\log\frac{P(O_t|s_j) \cdot P(s_j)}{P(O_t)}. \qquad (12)$$

The probability of the feature vector that appears in the denominator of Equation (12) can be calculated in that all statusses of the HMM are taken into consideration:

$$P(O_t) = \sum_k P(O_t|s_k) \cdot P(s_k) \qquad (13)$$

(also see Equation (6)).

The a priori probability $P(S_k)$ of these statusses has been determined in the preceding training. The local confidence standard $c_1(O_t|s_j)$ can thus be completely calculated.

A Second Confidence Standard

The definition of a second global confidence standard is composed of the relationship of the conditioned probabilities of a sequence O of feature vectors $O_t$ under the condition of a sequence of statusses W identifying the keyword, in the one instance, and, in another instance, under the model $\overline{W}$. The following derives:

$$C_2 = -\log \frac{P(O|W)}{P(O|\overline{W})}.\quad(4)$$

$\overline{W}$ thereby only represents a model that does not really exist but whose emission probability can be calculated. In contrast to the definition of the first global confidence standard, this definition leads to a symmetrical global confidence standard that exhibits a symmetry center at 0 when $$P(O|W)=P(O|\overline{W})\quad(14)$$

is met. Analogous to the case for the first global confidence standard, the following equation derives by insertion of Equations (8), (9) and (10), taking the respectively inverse model $\overline{a}_{\psi(t-1),\psi(t)}$ and $\overline{s}_{\psi(t)}$ into consideration:

$$C_2 = \sum_t -\log \frac{P(O_t|s_{\psi(t)}) \cdot a_{\psi(t-1),\psi(t)}}{P(O_t|\overline{s}_{\psi(t)}) \cdot \overline{a}_{\psi(t-1),\psi(t)}}.\quad(15)$$

A suitable local confidence standard $c_2(O_t)$ that can be employed in the search carried out by the Viterbi algorithm is defined as:

$$c_2(O_t|s_j) = -\log \frac{P(O_t|s_j)}{P(O_t|\overline{s}_j)}.\quad(16)$$

In this case, too, the local confidence standard $c_2(O_t|s_j)$ is calculatable since the denominator call be calculated in that all weighted emission probabilities except for $P(O_t|s_j)$ itself can be calculated:

$$P(O_t|\overline{s}_j) = \sum_{k \neq j} P(O_t|s_k) \cdot P(s_k)\quad(7)$$

also see Equation (7)).

The two definitions thus lead to a confidence standard that, given a low value (a negative value in the case of the global confidence standard $C_2$), indicates a high dependability that a keyword has been correctly recognized.

It is indicated as an advantage of this calculatable confidence standard that additional HMMs need not be trained nor is a dexterous manipulation of other affected parameters necessary. The confidence standards can be calculated upon employment of general phoneme HMMs.

The definition of confidence standard, as was shown above, can be operated with a Viterbi search based on hidden Markov models. Each individual status $s_j$ of the HMMs then emits not the negative logarithm of a probability $P(O_t|s_j)$ but a local confidence standard $c_1$ or $c_2$ instead.

Figure 2:
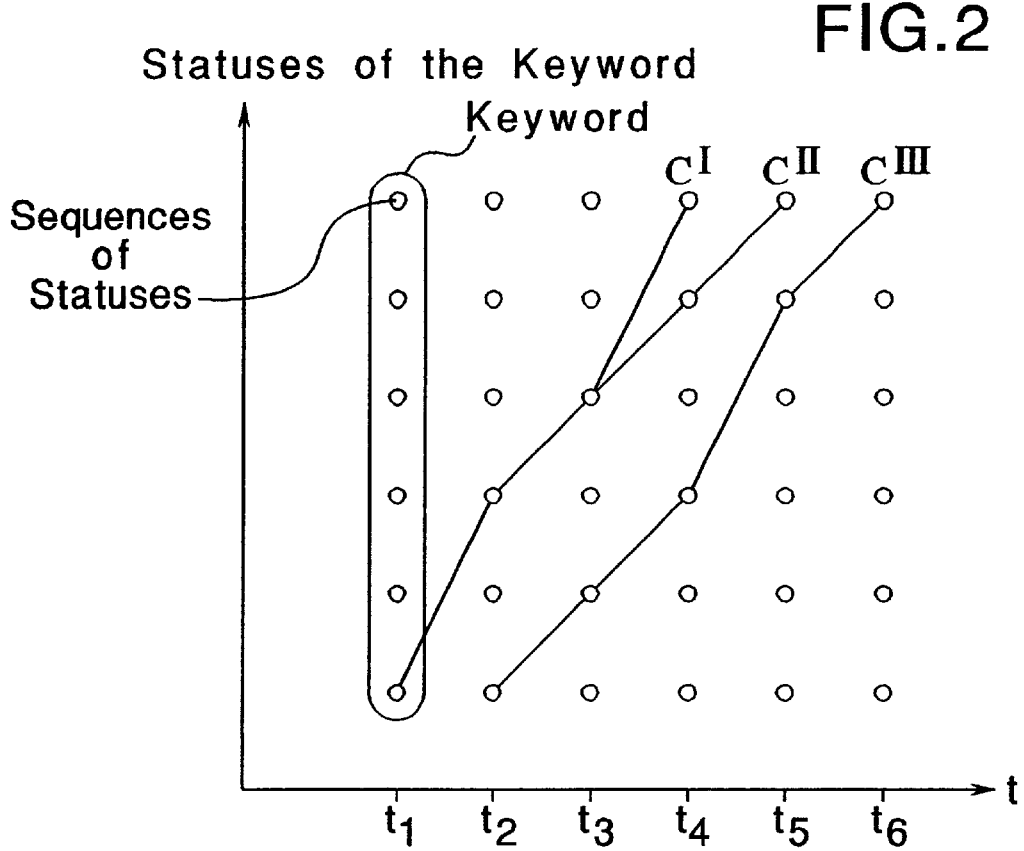
FIG. 2 is a sketch that illustrates the determination of a confidence standard.

FIG. 2 shows a sketch that illustrates the determination of a confidence standard.

In the upper diagram of FIG. 2, discrete times $t_1, t_2, \ldots$ are shown on the abscissa and the keyword SW characterized by a sequence of statusses ZS is shown on the ordinate. A continuous speech signal is shown over a time axis t in FIG. 2.

The continuous speech signal can contain a plurality of keywords, even different keywords, whereby only one keyword is preferably contained at one point in time.

The continuous voice signal is sampled at discrete times, and the information present at the respective sampling time is stored in a feature vector $O_t$. It is inventively assumed that a keyword can begin at each of these sampling times. A potential keyword whose paths can re-combine during the course of the Viterbi algorithm thus respectively begins at each of the times t1, t2 or t3. For simplification, one keyword is assumed here, whereby a plurality of keywords require a respective method for each keyword to be recognized.

When, thus, the keyword begins at time $t_1$, then an imaging of the feature vectors following the time $t_1$ is undertaken on the basis of the feature vectors $O_t$ acquired from the continuous speech. The best path PF with respect to the accumulated confidence standard is respectively determined. A confidence standard C derives for each time t. The value of the confidence standard provides information as to whether the keyword was contained in the continuous speech or not and ended at time t.

By way of example, paths are entered in FIG. 2 that begin at times $t_1$, $t_2$ and $t_3$ and—at times $t_4$, $t_5$ and $t_6$—lead to the global confidence standards $C^I$, $C^{II}$ and $C^{III}$. The global confidence standards belonging to $C^I$ and $C^{II}$ correspond to the possible keyword beginning in t1, whereas the global confidence standard $C^{III}$ is best achieved by a path that begins in $t_2$.

Let it thereby be noted that a global confidence standard C is observed at every time t, whereby an corresponding starting time is determined by application of the Viterbi algorithm.

When the continuous speech contains something completely different from the keyword, then the confidence standard is correspondingly poor; no recognition occurs. According to the functioning of the Viterbi algorithm, the length for various paths for determining the global confidence standard is also not equal, indicated in that the global confidence standard $C^I$ is formed from the local confidence standards of four statusses, whereas the global confidence standards $C^{II}$ and $C^{III}$ are composed of the local confidence standards of five statusses. The duration of the corresponding keywords thus derives as $4\Delta t$ and as $5\Delta t$.

FIG. 3 illustrates this relationship. The global confidence standards $C^I$, $C^{II}$ and $C^{III}$ determined from FIG. 2 are entered by way of example at the ordinate in FIG. 3. The abscissa again identifies the time t.

A separate global confidence standard C respectively derives for each time t.

A minimum MIN of the global confidence standard C is preferably defined and it is thus assumed that the keyword in the continuous speech is present in this minimum MIN.

This is of significance insofar as the threshold T for the global confidence standard is already downwardly transgressed, i.e. the keyword is recognized, at a time $t_a$. In view of the variable dynamic adaptation (different time durations for determining the global confidence standard), however, and as shown here in FIG. 3 by way of example, this keyword can be recognized "even better" at immediately impending times $t_{a+1}$. In order to determine when the keyword is optimally recognized, the minimum MIN with the corresponding time $t_{MIN}$ is identified. Proceeding from this time $t_{MIN}$, the starting time of the keyword in the continuous voice signal is determined with backtracking (see Rabiner et al). The start of the spoken keyword in the continuous voice signal is thus determined.

Let it thereby be noted that such a determination of the minimum can be implemented for each keyword; however, no other keyword can be recognized for the duration of a keyword. When a plurality of overlapping keywords are recognized in parallel from the continuous speech, then the keyword whose confidence standard reflects the highest dependability compared to the other keywords is preferably the right one.

Although various minor changes and modifications might be proposed by those skilled in the art, it will be understood that our wish is to include within the claims of the patent warranted hereon all such changes and modifications as reasonably come within our contribution to the art.

What is claimed is:

1. A method for recognizing a keyword in spoken language, comprising the steps of:

representing the keyword by a sequence of statuses W of hidden Markov models;

sampling the spoken language with a predetermined rate and producing a feature vector $O_t$ at every sampling time t for a voice signal from the spoken language belonging to the sampling time t;

imaging a sequence O of feature vectors $O_t$ onto the sequence of statuses with a Viterbi algorithm, whereby a local confidence standard is calculated on the basis of an emission standard at a status;

with the Viterbi algorithm supplying a global confidence standard;

recognizing the keyword in the spoken language when the following applies $$C(W,O)<T,$$

where

C( ) denotes the confidence standard,

W denotes the keyword, presented as a sequence of statuses,

O denotes the sequence of feature vectors $O_t$, and

T denotes a predetermined threshold; and otherwise, the keyword in the spoken language is not recognized.

2. The method according to claim 1 wherein the emission standard is a negative logarithm of an emission probability.

3. The method according to claim 1 wherein a new path in a first status of the sequence of W statuses begins at every sampling time.

4. The method according to claim 1 wherein the Viterbi algorithm supplies a global confidence standard at every sampling time.

5. The method according to claim 1 wherein the confidence standard C is defined by $$C = -\log P(W|O)$$

and the corresponding local confidence standard c is defined by $$c = -\log \frac{P(O_t|s_j) \cdot P(s_j)}{P(O_t)}$$

where $S_j$ denotes a status of the sequence of statuses.

6. The method according to claims 1 wherein the confidence standard C is defined by $$C = -\log \frac{P(O|W)}{P(O|\overline{W})}$$

and the corresponding local confidence standard is defined by $$c = -\log \frac{P(O_t|s_j)}{P(O_t|\overline{s_j})}$$

where $\overline{W}$ denotes not the keyword W, and $\overline{s_j}$ denotes not the status $s_j$.

7. The method according to claim 1 wherein the global confidence standard is determined for a predetermined time duration, and conclusions are drawn about a starting time of the keyword from a minimum of the global confidence standard.

8. The method according to claim 7 wherein the minimum lies below a predetermined threshold.

9. The method of claim 1 wherein for recognizing a plurality of keywords, the method is employed in parallel for each keyword, whereby the keyword with a better confidence standard is recognized as soon as a plurality of prescribed thresholds are downwardly transgressed.

10. The method according to claim 9 wherein no further keyword is recognized for the time span in which a keyword that has been recognized was contained in the spoken language.

11. A method for recognizing a keyword in spoken language, comprising the steps of:

representing the keyword by a sequence of statuses W of hidden Markov models;

sampling the spoken language with a predetermined rate and producing a feature vector $O_t$ at every sampling time t for a voice signal from the spoken language belonging to the sampling time t;

imaging a sequence O of feature vectors $O_t$ onto the sequence of statuses with a Viterbi algorithm, whereby a local confidence standard is calculated on the basis of an emission standard at a status;

with the Viterbi algorithm supplying a global confidence standard; and recognizing the keyword in the spoken language when the following applies:

$$C(W,O)<T,$$

where

C( ) denotes the confidence standard,

W denotes the keyword, presented as a sequence of statuses,

O denotes the sequence of feature vectors $O_t$, and

T denotes a predetermined threshold.

* * * * *